(12) United States Patent
Michikoshi et al.

(10) Patent No.: US 9,371,068 B2
(45) Date of Patent: Jun. 21, 2016

(54) VEHICLE CONTROL APPARATUS

(75) Inventors: Yosuke Michikoshi, Miyoshi (JP); Shingo Eto, Gamagori (JP); Yuji Inoue, Nisshin (JP); Yukihiko Ideshio, Nisshin (JP); Akihiro Sato, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 128 days.

(21) Appl. No.: 14/373,819

(22) PCT Filed: Feb. 16, 2012

(86) PCT No.: PCT/JP2012/053723
§ 371 (c)(1),
(2), (4) Date: Sep. 15, 2014

(87) PCT Pub. No.: WO2013/121567
PCT Pub. Date: Aug. 22, 2013

(65) Prior Publication Data
US 2015/0072829 A1    Mar. 12, 2015

(51) Int. Cl.
*B60W 20/00* (2006.01)
*B60W 10/02* (2006.01)
*B60W 10/08* (2006.01)
*B60W 10/06* (2006.01)
*B60K 6/48* (2007.10)

(52) U.S. Cl.
CPC ............. *B60W 20/10* (2013.01); *B60K 6/48* (2013.01); *B60W 10/02* (2013.01); *B60W 10/026* (2013.01); *B60W 10/06* (2013.01); *B60W 10/08* (2013.01); *B60W 20/40* (2013.01); *B60K 2006/4825* (2013.01); *B60W 2710/027* (2013.01); *Y02T 10/6221* (2013.01); *Y02T 10/6252* (2013.01); *Y02T 10/6286* (2013.01); *Y10S 903/93* (2013.01); *Y10T 477/26* (2015.01)

(58) Field of Classification Search
None
See application file for complete search history.

(56) References Cited

U.S. PATENT DOCUMENTS

| 6,317,665 | B1 | 11/2001 | Tabata et al. |
| 2002/0173391 | A1 | 11/2002 | Endo et al. |
| 2007/0056783 | A1 | 3/2007 | Joe et al. |
| 2007/0275818 | A1 | 11/2007 | Kouno |

FOREIGN PATENT DOCUMENTS

| JP | 2000-120858 A | 4/2000 |
| JP | 2002-340158 A | 11/2002 |
| JP | 2007-69789 A | 3/2007 |
| JP | 2008-1349 A | 1/2008 |

*Primary Examiner* — Ramya Burgess
*Assistant Examiner* — Timothy M Hannon
(74) *Attorney, Agent, or Firm* — Sughrue Mion, PLLC

(57) ABSTRACT

A control device of a vehicle including an engine, an electric motor, and a clutch configured to achieve a mechanically directly-coupled state of a power transmission path between the engine/the electric motor and drive wheels, the control device causing the clutch to be slip-engaged or released when the engine is started during motor running in which only the electric motor is used as a drive force source for running with the clutch engaged, the control device being configured such that when the clutch is engaged during the motor running, an engagement pressure is made lower than an engagement pressure when the clutch is engaged during engine running in which at least the engine is used as a drive force source for running, and in the case of running with the clutch engaged, the engagement pressure of the clutch is constantly adjusted based on output torque of the electric motor during the motor running, while the engagement pressure of the clutch is not adjusted during the engine running.

4 Claims, 6 Drawing Sheets

VEHICLE CONTROL APPARATUS

CROSS REFERENCE TO RELATED APPLICATIONS

This application is a National Stage of International Application No. PCT/JP2012/053723 filed Feb. 16, 2012, the contents of which are incorporated herein by reference in their entirety.

TECHNICAL FIELD

The present invention relates to a control device of a vehicle including a clutch achieving a mechanically directly-coupled state of a power transmission path between an engine/an electric motor and drive wheels.

BACKGROUND ART

A vehicle is well-known that includes an engine and an electric motor acting as drive force sources, and a clutch capable of achieving a mechanically directly-coupled state of a power transmission path between the drive force sources and drive wheels. For example, this corresponds to a vehicle described in Patent Document 1. In a technique proposed in Patent Document 1, in a control device of a vehicle including an engine and an electric motor as drive force sources and disposed with an automatic transmission with a lockup clutch capable of directly coupling the drive force sources and drive wheels, if the engine is started from motor running with the lockup clutch engaged, the lockup clutch is slip-engaged or released to suppress transmission of torque variation at the engine start to an output, thereby suppressing occurrence of shock associated with the torque variation.

PRIOR ART DOCUMENT

Patent Document

Patent Document 1: Japanese Laid-Open Patent Publication No. 2000-120858

SUMMARY OF THE INVENTION

Problem to Be Solved by the Invention

To maintain a completely engaged state for a torque to be transmitted, a clutch is not generally engaged at a clutch engagement pressure (i.e., a clutch pressure) adjusted and controlled from an original pressure based on a command pressure corresponding to the torque to be transmitted and is often engaged at a clutch pressure based on a uniform command pressure (e.g., maximum command pressure). If the conventional technique as described in Patent Document 1 is implemented in such a case, when an engine is started while the clutch is engaged, the engine is started after an actual clutch pressure decreases from the clutch pressure based on the maximum command pressure to a clutch pressure for slip-engagement or release. As a result, the engine must stand by for the start until the clutch pressure decreases to the clutch pressure for slip-engagement or release, which may deteriorate drivability (e.g., responsiveness of drive force to a drive request amount; power performance). Alternatively, the engine must be started before the clutch pressure decreases (i.e., while the clutch is still in an engaged state) and an engine start shock may not be suppressed. Particularly, since it is considered that a driver desires a quick increase in drive force at the engine start, the engine is desirably started quickly while the engine start shock is suppressed. The problem as described above is unknown and no proposal has been made on starting the engine quickly while the engine start shock is suppressed when the engine is started during motor running with a clutch engaged.

The present invention was conceived in view of the situations and it is therefore an object of the present invention to provide a control device of a vehicle capable of satisfying both the suppression of engine start shock and the improvement in drivability at the engine start during motor running with a clutch engaged.

Means for Solving the Problem

To achieve the object, the first aspect of the invention provides a control device of a vehicle including (a) an engine, an electric motor, and a clutch configured to achieve a mechanically directly-coupled state of a power transmission path between the engine/the electric motor and drive wheels, the control device causing the clutch to be slip-engaged or released when the engine is started during motor running in which only the electric motor is used as a drive force source for running with the clutch engaged, wherein (b) when the clutch is engaged during the motor running, an engagement pressure is made lower than an engagement pressure when the clutch is engaged during engine running in which at least the engine is used as a drive force source for running.

Effects of the Invention

Consequently, since the clutch is slip-engaged or released when the engine is started during the motor running with the clutch engaged, it is desirable to enable a quick transition to slip-engagement or release while the engagement of the clutch is maintained during the motor running and, in this regard, the engagement pressure when the clutch is engaged without a slip during the motor running can be made lower as compared to the engine running, thereby making a quick transition to slip-engagement or release to initiate the start of the engine. Thus, both the suppression of engine start shock and the improvement in drivability can be satisfied at the engine start during the motor running with the clutch engaged. On the other hand, also when the engine is stopped during the engine running with the clutch engaged, it is conceivable that the clutch is slip-engaged or released in the same way so as to suppress a shock due to torque variation. However, at the engine stop, since it is considered that a driver does not desire a quick stop of the engine unlike the engine start at which it is considered that the driver desires an increase in the drive force, the engagement pressure when the clutch is engaged without a slip during the engine running can be set higher as compared to the motor running so as to reduce the control of changing the engagement pressure when the clutch is engaged depending on an engine torque as compared to the motor running, thereby making the control easier (i.e., simplifying the control).

The second aspect of the invention provides the control device of a vehicle recited in the first aspect of the invention, wherein in the case of running with the clutch engaged, the engagement pressure of the clutch is constantly adjusted based on output torque of the electric motor during the motor running, while the engagement pressure of the clutch is not adjusted during the engine running. Consequently, during the motor running, the engagement pressure of the clutch can be made lower as compared to during the engine running while the engagement of the clutch (i.e., a state where the clutch is engaged without a slip) is maintained, such that the transition to slip-engagement or release can quickly be made when the engine is started. On the other hand, during the engine running, the clutch can certainly be engaged at the engagement pressure of the clutch higher as compared to during the motor running while the control of the engagement pressure of the clutch is simplified.

The third aspect of the invention provides the control device of a vehicle recited in the first or second aspect of the invention, wherein a fluid transmission device is disposed on the power transmission path between the engine/the electric motor and the drive wheels, wherein the clutch is a lockup clutch configured to directly couple an input-side rotating member and an output-side rotating member of the fluid transmission device. Consequently, both the suppression of engine start shock and the improvement in drivability can be satisfied at the engine start during the motor running with the lockup clutch engaged.

The fourth aspect of the invention provides the control device of a vehicle recited in the first or second aspect of the invention, wherein an automatic transmission is disposed that makes up a portion of a power transmission path between the electric motor and the drive wheels, and wherein the clutch is an engagement device included in the automatic transmission. Consequently, both the suppression of engine start shock and the improvement in drivability can be satisfied at the engine start during the motor running with the engagement device of the automatic transmission engaged.

The fifth aspect of the invention provides the control device of a vehicle recited in any one of the first to fourth aspects of the invention, wherein a connecting/disconnecting clutch is included that connects/disconnects a power transmission path between the engine and the electric motor, and wherein during the motor running with the connecting/disconnecting clutch released, the engine is started while the connecting/disconnecting clutch is controlled toward engagement. Consequently, the engine start shock due to torque variation associated with explosion at the engine start can obviously be suppressed, and the engine start shock associated with engagement of the connecting/disconnecting clutch can also be suppressed.

MODE FOR CARRYING OUT THE INVENTION

In the present invention, preferably, the automatic transmission is made up of an automatic transmission having the fluid transmission device, or an automatic transmission having an auxiliary transmission. This automatic transmission is made up of a known planetary gear automatic transmission having rotating elements of a plurality of sets of planetary gear devices selectively coupled by engagement devices to achieve a plurality of gear stages in an alternative manner; a synchronous meshing type parallel two-shaft automatic transmission that is a synchronous meshing type parallel two-shaft transmission including pairs of always meshing change gears between two shafts and that has gear stages automatically switched by a hydraulic actuator; a so-called DCT (Dual Clutch Transmission) that is a synchronous meshing type parallel two-shaft automatic transmission and that is of a type having two systems of input shafts; a so-called belt type continuously variable transmission and a so-called toroidal type continuously variable transmission having gear ratios varied continuously in a stepless manner, etc. The clutch is assumed to be the lockup clutch as well as the engagement device involved with a shift of the automatic transmission, an input clutch of the automatic transmission, an engagement device making up a forward/backward switching device included along with the continuously variable transmission, etc.

Preferably, for example, an internal combustion engine such as a gasoline engine and a diesel engine generating power from combustion of fuel is widely used as the engine.

Preferably, a wet or dry engagement device is used as the connecting/disconnecting clutch.

An example of the present invention will now be described in detail with reference to the drawings.

Example

Figure 1:
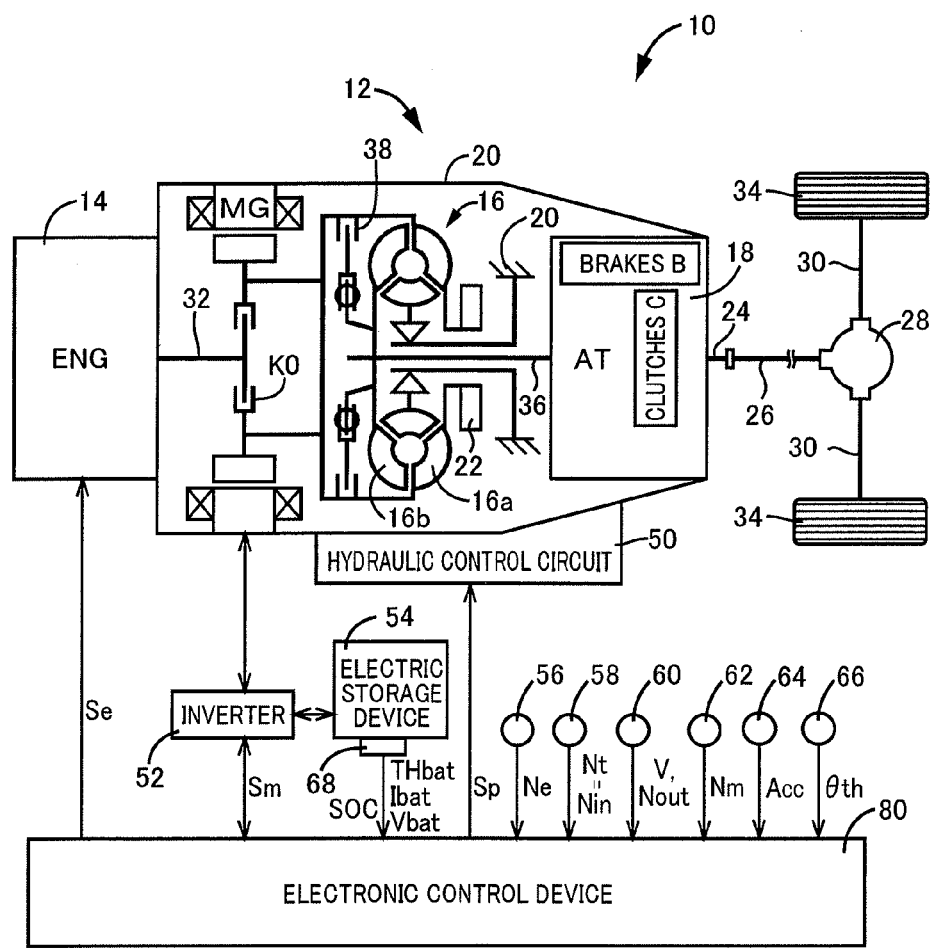
FIG. 1 is a diagram for explaining a general configuration of a power transmission path making up a vehicle to which the present invention is applied, and is a diagram for explaining a main portion of a control system disposed in the vehicle.

FIG. 1 is a diagram for explaining a general configuration of a power transmission path from an engine 14 to drive wheels 34 making up a vehicle 10 to which the present invention is applied, and is a diagram for explaining a main portion of a control system disposed in the vehicle 10 for output control of the engine 14, shift control of an automatic transmission 18, drive control of an electric motor MG, etc.

In FIG. 1, the vehicle 10 is a hybrid vehicle including the engine 14 and the electric motor MG acting as drive force sources for running. A power transmission device 12 includes in a transmission case 20 acting as a non-rotating member, in order from the engine 14 side, an engine connecting/disconnecting clutch K0, a torque converter 16, and the automatic transmission 18. The power transmission device 12 also includes a propeller shaft 26 coupled to a transmission output shaft 24 that is an output rotating member of the automatic transmission 18, a differential gear 28 coupled to the propeller shaft 26, a pair of axles 30 coupled to the differential gear 28, etc. The power transmission device 12 configured as described above is preferably used in the vehicle 10 of the FR (front-engine rear-drive) type, for example. In the power transmission device 12, if the engine connecting/disconnecting clutch K0 is engaged, power of the engine 14 is transmitted from an engine coupling shaft 32 coupling the engine 14 and the engine connecting/disconnecting clutch K0, sequentially through the engine connecting/disconnecting clutch K0, the torque converter 16, the automatic transmission 18, the propeller shaft 26, the differential gear 28, the pair of the axles 30, etc., to a pair of the drive wheels 34.

The torque converter 16 is a fluid transmission device transmitting power (having the same meaning as torque and force if not particularly distinguished) input to a pump impeller 16a that is an input-side rotating member, from a turbine impeller 16b that is an output-side rotating member coupled to a transmission input shaft 36 via fluid toward the automatic transmission 18. The torque converter 16 includes a known lockup clutch 38 directly coupling the pump impeller 16a and the turbine impeller 16b. The lockup clutch 38 directly couples the pump impeller 16a and the turbine impeller 16b and consequently achieves a mechanically directly-coupled state of a power transmission path between the engine 14/the electric motor MG and the drive wheels 34. The pump impeller 16a is coupled to an oil pump 22. The oil pump 22 is a mechanical oil pump rotationally driven by the engine 14 (or the electric motor MG) to generate an operating oil pressure for providing the shift control of the automatic transmission 18. The lockup clutch 38 is subjected to engagement/release control by a hydraulic control circuit 50 disposed on the power transmission device 12 by using an oil pressure generated by the oil pump 22 as an original pressure.

The electric motor MG is a so-called motor generator having a function of a motor generating mechanical power from electric energy and a function of an electric generator generating electric energy from mechanical energy. In other words, the electric motor MG may act as a drive force source for running generating power for running instead of the engine 14 that is a power source or along with the engine 14. The electric motor MG also performs operations such as generating electric energy through regeneration from the power generated by the engine 14 or a driven force (mechanical energy) input from the side of the drive wheels 34 to accumulate the electric energy via an inverter 52 into an electric storage device 54. The electric motor MG is coupled to a power transmission path between the engine connecting/disconnecting clutch K0 and the torque converter 16 (i.e., operatively coupled to the pump impeller 16a) and power is mutually transmitted between the electric motor MG and the pump impeller 16a. Therefore, the electric motor MG is coupled to the transmission input shaft 36 that is an input rotating member of the automatic transmission 18 in a power transmittable manner as is the case with the engine 14.

The engine connecting/disconnecting clutch K0 is a wet multi-plate type hydraulic friction engagement device in which a plurality of friction plates overlapped with each other is pressed by a hydraulic actuator, for example, and is subjected to engagement/release control by the hydraulic control circuit 50 by using an oil pressure generated by the oil pump 22 as an original pressure. In the engagement/release control, a torque capacity of the engine connecting/disconnecting clutch K0 is varied, for example, continuously, through pressure adjustment of a linear solenoid valve etc., in the hydraulic control circuit 50. The engine connecting/disconnecting clutch K0 rotates the pump impeller 16a integrally with the engine 14 via the engine coupling shaft 32 in an engaged state. Therefore, in the engaged state of the engine connecting/disconnecting clutch K0, the power from the engine 14 is input to the pump impeller 16a. On the other hand, in a released state of the engine connecting/disconnecting clutch K0, the power transmission between the pump impeller 16a and the engine 14 is interrupted. As described above, since the electric motor MG is operatively coupled to the pump impeller 16a, the engine connecting/disconnecting clutch K0 obviously acts as a clutch connecting/disconnecting the power transmission path between the engine 14 and the torque converter 16 and also acts as a connecting/disconnecting clutch connecting/disconnecting the power transmission path between the engine 14 and the electric motor MG.

The automatic transmission 18 is coupled to the electric motor MG without via the engine connecting/disconnecting clutch K0 in a power transmittable manner and makes up a portion of the power transmission path between the engine 14/the electric motor MG and the drive wheels 34 to transmit the power from the drive force source for running (the engine 14 and the electric motor MG) toward the drive wheels 34. The automatic transmission 18 is a known planetary gear type multistage transmission including a plurality of hydraulic friction engagement devices such as clutches C and brakes B as engagement devices, for example, and having a plurality of shift stages (gear stages) selectively established through a shift made by engagement and release of the hydraulic friction engagement devices. In the automatic transmission 18, each of the clutches C and the brakes B is subjected to the engagement/release control by the hydraulic control circuit 50 to establish a predetermined gear stage depending on driver's accelerator operation, a vehicle speed V, etc.

The vehicle 10 includes an electronic control device 80 including a control device of the vehicle 10 related to hybrid drive control, for example. The electronic control device 80 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 80 provides the output control of the engine 14, the drive control of the electric motor MG including regenerative control of the electric motor MG, the shift control of the automatic transmission 18, torque capacity control of the engine connecting/disconnecting clutch K0, the engagement/release control of the lockup clutch 38, etc., and is configured separately as needed for engine control, electric motor control, hydraulic control, etc. The electronic control device 80 is supplied with each of various signals (e.g., an engine rotation speed Ne that is a rotation speed of the engine 14, a turbine rotation speed Nt, i.e., a transmission input rotation speed Nin that is a rotation speed of the transmission input shaft 36, a transmission output rotation speed Nout that is a rotation speed of the transmission output shaft 24 corresponding to the vehicle speed V, an electric motor rotation speed Nm that is a rotation speed of the electric motor MG, an accelerator opening degree Acc corresponding to a drive request amount to the vehicle 10 from a driver, a throttle valve opening degree θth of an electronic throttle valve, a battery temperature THbat, a battery input/output current (a battery charging/discharging current) Ibat, a battery voltage Vbat, and a state of charge (charge capacity) SOC of the electric storage device 54) based on detection values from various sensors (e.g., an engine rotation speed sensor 56, a turbine rotation speed sensor 58, an output shaft rotation speed sensor 60, an electric motor rotation speed sensor 62, an accelerator opening degree sensor 64, a throttle sensor 66, and a battery sensor 68). The electronic control device 80 outputs, for example, an engine output control command signal Se for the output control of the engine 14, an electric motor control command signal Sm for controlling an operation of the electric motor MGz and an oil pressure command signal Sp for actuating an electromagnetic valve (solenoid valve) etc. included in the hydraulic control circuit 50 for controlling the hydraulic actuators of the engine connecting/disconnecting clutch K0, the lockup clutch 38, and the clutches C and the brakes B of the automatic transmission 18, to engine control devices such as a throttle actuator and a fuel supply device, the inverter 52, and the hydraulic control circuit 50, respectively.

Figure 2:
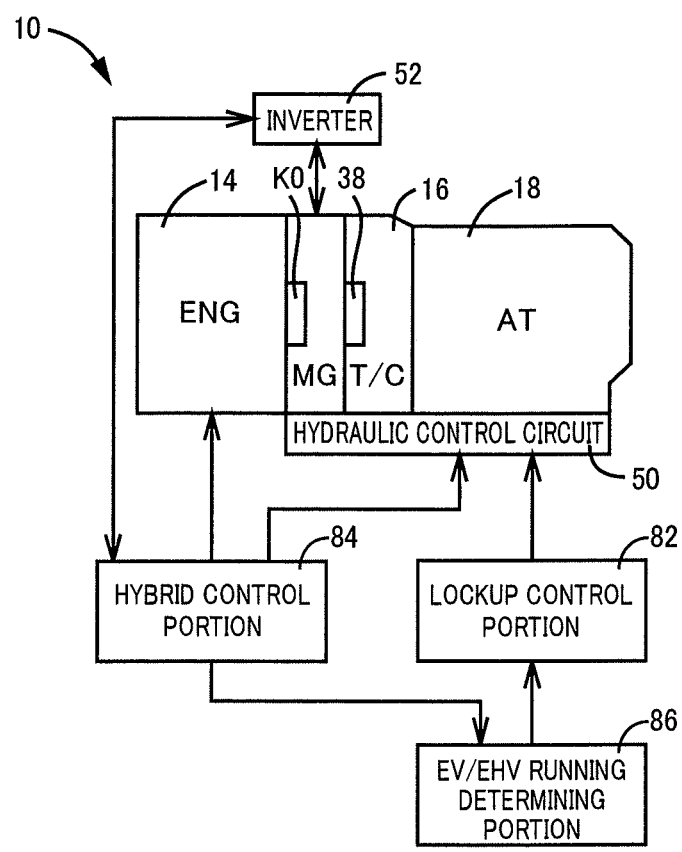
FIG. 2 is a functional block diagram for explaining a main portion of control functions of an electronic control device.
Figure 3:
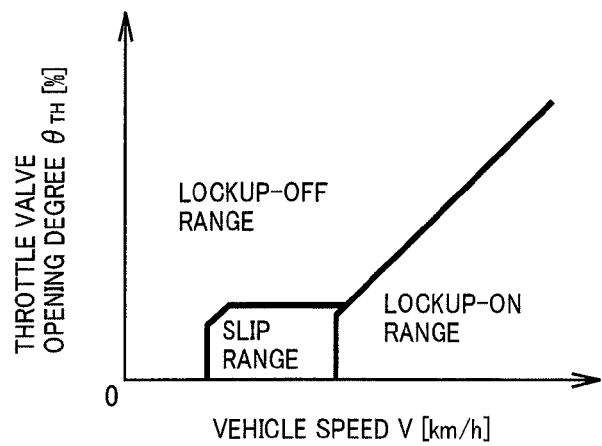
FIG. 3 is a diagram of an example of a lockup range diagram used when a lockup clutch is controlled.

FIG. 2 is a functional block diagram for explaining a main portion of control functions of the electronic control device 80. In FIG. 2, a lockup control means, i.e., a lockup control portion 82 controls switching of an actuation state of the lockup clutch 38 based on a vehicle state indicated by the actual vehicle speed V and throttle valve opening degree θth from a preliminarily obtained and stored (i.e., predefined) relationship (a map, a lockup range diagram) having a lockup-off range in which the lockup clutch 38 is released, a slip range in which the lockup clutch 38 is slip-engaged, and a lockup-on range in which the lockup clutch 38 is completely engaged (i.e., the lockup clutch 38 is engaged without a slip, which is the same meaning as engaging the lockup clutch 38) in two-dimensional coordinates using the vehicle speed V and the throttle valve opening degree θth as variables as depicted in FIG. 3, for example. The lockup control portion 82 determines the actuation state of the lockup clutch 38 to be controlled based on the actual vehicle state from the lockup range diagram and outputs to the hydraulic control circuit 50 a command value (LU command pressure) Slu of an engagement oil pressure (lockup clutch pressure) of the lockup clutch 38 for switching to the determined actuation state. This LU command pressure Slu is one of the oil pressure command signals Sp.

A hybrid control means, i.e., a hybrid control portion 84, has a function as an engine drive control portion controlling drive of the engine 14 and a function as an electric motor operation control portion controlling the operation of the electric motor MG as a drive force source or an electric generator through the inverter 52, and provides the hybrid drive control by the engine 14 and the electric motor MG through these control functions. For example, the hybrid control portion 84 calculates a request drive torque Touttgt as a drive request amount (i.e. a driver request amount) to the vehicle 10 based on the accelerator opening degree Acc and the vehicle speed V and controls the drive force source for running so as to achieve an output torque of the drive force source for running (the engine 14 and the electric motor MG) such that the request drive torque Touttgt is acquired in consideration of a transmission loss, an accessory load, a gear stage of the automatic transmission 18, the charge capacity SOC of the electric storage device 54, etc. The drive request amount can be implemented by using not only the request drive torque Touttgt at the drive wheels 34 but also a request drive force at the drive wheels 34, a request drive power at the drive wheels 34, a request transmission output torque at the transmission output shaft 24, a request transmission input torque at the transmission input shaft 36, a target torque of the drive force source for running (the engine 14 and the electric motor MG), etc. The drive request amount can be implemented by simply using the accelerator opening degree Acc, the throttle valve opening degree θth, an intake air amount, etc.

Specifically, for example, if the request drive torque Touttgt is within a range that can be covered solely by an output torque (electric motor torque) Tm of the electric motor MG, the hybrid control portion 84 sets a running mode to a motor running mode (hereinafter, EV mode) and performs motor running (EV running) for running with only the electric motor MG used as the drive force source for running. On the other hand, for example, if the request drive torque Touttgt is within a range that cannot be covered unless at least an output torque (engine torque) Te of the engine 14 is used, the hybrid control portion 84 sets the running mode to an engine running mode, i.e., a hybrid running mode (hereinafter, EHV mode), and performs engine running, i.e., hybrid running (EHV running), for running with at least the engine 14 used as the drive force source for running.

Figure 4:
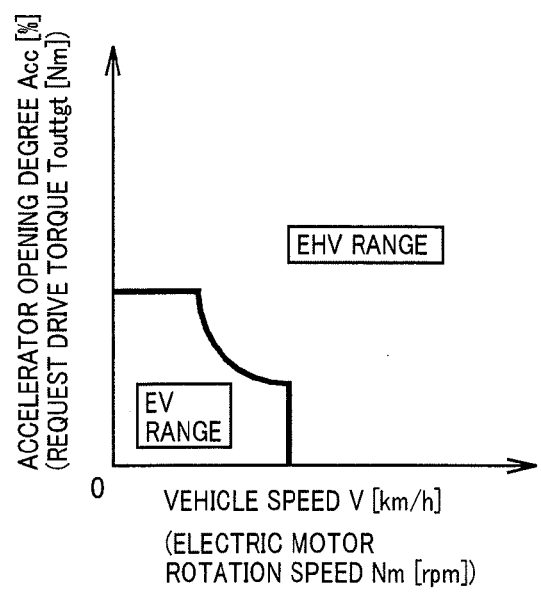
FIG. 4 is a diagram of an example of an EV/EHV range map used when the switching between an EV running and the engine running is made.

FIG. 4 is a diagram of a relationship (EV/EHV range map) having an EV-EHV switch line dividing a range into a motor running range (EV range) and an engine running range (EHV range) defined in advance in two-dimensional coordinates using the vehicle speed V and the drive request amount (e.g., the accelerator opening degree Acc) as variables. The hybrid control portion 84 performs the EV running if the vehicle state (e.g., the actual vehicle speed V and accelerator opening degree Acc) is within the EV range, for example, and performs the EHV running if the vehicle state is within the EHV range, for example. Although the EV-EHV switch line in the EV/EHV range map of FIG. 4 is represented as a line for convenience, the line is a series of points represented by the vehicle state in terms of control. The EV-EHV switch line desirably includes an EV-to-EHV switch line at the time of a transition from the EV range to the EHV range and an EHV-to-EV switch line at the time of a transition from the EHV range to the EV range so that hysteresis is included.

If the EV running is performed, the hybrid control portion 84 releases the engine connecting/disconnecting clutch K0 to interrupt the power transmission path between the engine 14 and the torque converter 16 and causes the electric motor MG to output the electric motor torque Tm required for the EV running. On the other hand, if the EHV running is performed, the hybrid control portion 84 engages the engine connecting/disconnecting clutch K0 to connect the power transmission path between the engine 14 and the torque converter 16 and causes the engine 14 to output the engine torque Te required for the EHV running while causing the electric motor MG to output the electric motor torque Tm as an assist torque as needed.

For example, if a transition of the vehicle state is made from the EV range to the EHV range during the EV running, the hybrid control portion 84 switches the running mode from the EV mode to the EHV mode, determines an initiation of the start of the engine 14, and starts the engine 14 to perform the EHV running. In a method of starting the engine 14 by the hybrid control portion 84, for example, the engine is started while the engine connecting/disconnecting clutch K0 is controlled toward engagement (from another viewpoint, while the engine 14 is rotationally driven by the electric motor MG). Specifically, when determining the initiation of the start of the engine 14, the hybrid control portion 84 outputs a command value (K0 command pressure) of an engagement oil pressure (K0 clutch pressure) of the engine connecting/disconnecting clutch K0 so as to acquire a K0 transmission torque Tk (corresponding to a torque capacity of the engine connecting/disconnecting clutch K0) for transmitting an engine start torque Tms that is a torque required for the engine start toward the engine 14, thereby raising the engine rotation speed Ne. When it is determined that the engine rotation speed Ne is raised to a predetermined rotation speed enabling a complete explosion, the hybrid control portion 84 starts the engine 14 by initiating engine ignition, fuel supply, etc.

Since the engine start torque Tms corresponds to the electric motor torque Tm going through the connecting/disconnecting clutch K0 toward the engine 14, the electric motor torque Tm going toward the drive wheels 34 is accordingly reduced. Therefore, at the start of the engine 14, the hybrid control portion 84 outputs to the inverter 52 a command for outputting the electric motor torque Tm of the magnitude acquired by adding the electric motor torque Tm required as the engine start torque Tms to the electric motor torque Tm during the EV running, so as to suppress a drop in drive torque Tout.

If deviation occurs between additional torque of the electric motor torque Tm and the engine start torque Tms due to variation in components or variation in control, the drive torque Tout may vary and a shock at the engine start (engine start shock) may occur. Also when deviation occurs in delivery of torque from the electric motor torque Tm to the engine torque Te, the drive torque Tout may vary and the engine start shock may occur. The engine start shock may also occur when torque variation associated with the explosion at the engine start is transmitted to the drive wheels 34. Particularly when the lockup clutch 38 is engaged, the torque variation at the engine start is hardly suppressed as compared to when the lockup clutch 38 is slip-engaged or released, and the engine start shock remarkably occurs.

Therefore, if the hybrid control portion 84 determines the initiation of the start of the engine 14 during the EV running with the lockup clutch 38 engaged, the lockup control portion 82 causes the lockup clutch 38 to be slip-engaged or released (more preferably, causes the lockup clutch 38 to be slip-engaged) before the start of the engine 14. After the determination of the initiation of the start of the engine 14, if the slip-engagement or release of the lockup clutch 38 is completed by the lockup control portion 82, the hybrid control portion 84 controls the engine connecting/disconnecting clutch K0 toward engagement to raise the engine rotation speed Ne and starts the engine 14 by engine ignition etc. to perform the EHV running. If the engine start is completed by the hybrid control portion 84, the lockup control portion 82 engages the lockup clutch 38.

As described above, if the engine is started during the EV running for running with the lockup clutch 38 engaged, the engine is started after the actual lockup clutch pressure decreases to a lockup clutch pressure at which the lockup clutch 38 is slip-engaged or released. As a result, the engine must stand by for the start until the actual pressure decreases to the lockup clutch pressure for slip-engagement or release, which may deteriorate drivability. Alternatively, if the engine is started while the lockup clutch 38 is still engaged, the engine start shock may not be suppressed. If the initiation of the start of the engine 14 is determined, since it is considered that a driver desires a quick increase in the drive torque Tout, the engine is desirably started quickly while the engine start shock is suppressed.

The following discusses a lockup clutch pressure when the lockup clutch 38 is engaged during the EV running (i.e., a lockup clutch pressure when the lockup clutch 38 is engaged without a slip; an engaged lockup clutch pressure). First, it is conceivable that the engaged lockup clutch pressure during the EV running is made as low as possible in accordance with the electric motor torque Tm within a range in which the engagement is maintained, so as to quickly reduce the pressure to the lockup clutch pressure for slip-engagement or release at the time of the engine start. On one hand, it is easier (more simple) to set the engaged lockup clutch pressure to a higher value at which the engagement can certainly be achieved in terms of controllability as compared to setting the engaged lockup clutch pressure as low as possible in accordance with the electric motor torque Tm. On the other hand, even when the engine 14 is stopped (e.g., when a transition is made to the motor running) during the engine running for running with the lockup clutch 38 engaged, a shock may occur in association with torque variation since the drive force source is switched or the engine connecting/disconnecting clutch K0 is released. Therefore, it is conceivable that when the engine is stopped, the lockup clutch 38 is temporarily slip-engaged or released. When the engine 14 is stopped, it is considered that a driver does not desire a quick decrease in the drive torque Tout and, therefore, the engine does not need to be quickly stopped. Therefore, it is conceivable that the engaged lockup clutch pressure during the engine running is set higher to a value at which the engagement is certainly achieved for easier controllability.

From another viewpoint, since a target torque is output by the electric motor MG having relatively smaller torque variation of an actual value (actual torque variation) relative to a command value during the EV running, even when the engaged lockup clutch pressure is set lower, it is more easily avoided that the maintenance of complete engagement of the lockup clutch 38 is lost (e.g., the lockup clutch 38 is slip-engaged) due to the actual torque variation in the electric motor MG. On the other hand, since a target torque is output by the engine 14 having the actual torque variation larger than the electric motor MG during the engine running, the complete engagement of the lockup clutch 38 is hardly maintained (e.g., the lockup clutch 38 is easily slip-engaged) unless the engaged lockup clutch pressure is made larger as compared to during the EV running in consideration of the actual torque variation of the engine 14.

In view of the results of the discussion, the electronic control device 80 of this example makes the engaged lockup clutch pressure during the EV running lower than the engaged lockup clutch pressure during the engine running. In the case of running with the lockup clutch 38 engaged, the electronic control device 80 constantly adjusts the engaged lockup clutch pressure based on the electric motor torque Tm during the EV running, while the electronic control device 80 does not adjust the engaged lockup clutch pressure during the engine running (i.e., does not adjust the engaged lockup clutch pressure based on the engine torque Te).

More specifically, returning to FIG. 2, an EV/EHV running determining means, i.e., an EV/EHV running determining portion 86 determines a running state of the vehicle 10. For example, the EV/EHV running determining portion 86 determines whether the vehicle 10 is during the EV running based on a control operation by the hybrid control portion 84. The EV/EHV running determining portion 86 also determines whether the vehicle 10 is during the engine running (EHV running) based on the control operation by the hybrid control portion 84.

Figure 5:
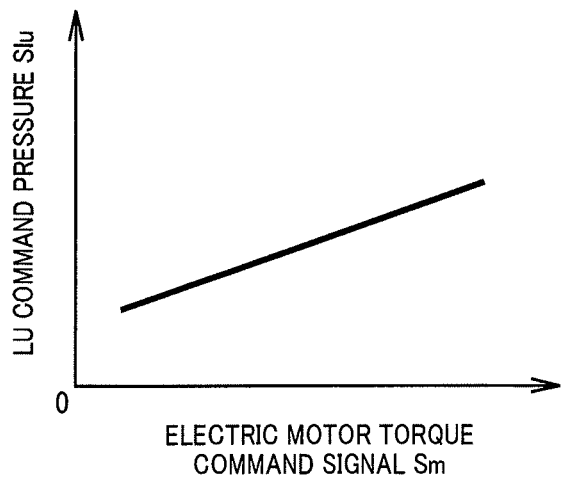
FIG. 5 is a diagram of an example of an LU command pressure map used when an engaged lockup clutch pressure during the EV running is controlled.

If the EV/EHV running determining portion 86 determines that the vehicle 10 is during the EV running, the lockup control portion 82 determines whether the vehicle is in the lockup-on range, based on the actual vehicle speed V and throttle valve opening degree θth from the lockup range diagram as depicted in FIG. 3, for example. If it is determined that the vehicle is in the lockup-on range, the lockup control portion 82 outputs to the hydraulic control circuit 50 an LU command pressure Slu corresponding to the electric motor torque Tm during the EV running to engage the lockup clutch 38. The lockup control portion 82 determines this LU command pressure Slu corresponding to the electric motor torque Tm during the EV running, based on the electric motor control command signal Sm during the EV running, from a predefined relationship (LU command pressure map) as depicted in, for example, FIG. 5, between the electric motor control command signal Sm for outputting the electric motor torque Tm required for the EV running and the LU command pressure Slu for acquiring the lowest possible engaged lockup clutch pressure within a range in which the electric motor torque Tm can certainly be transmitted even when the actual torque variation occurs.

Figure 6:
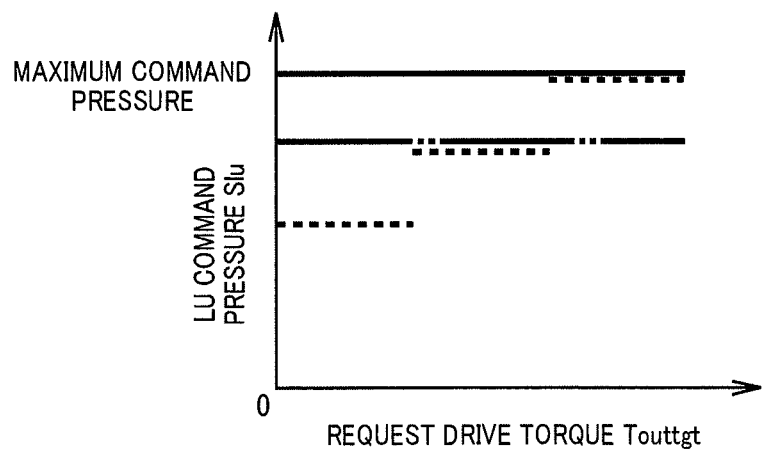
FIG. 6 is a diagram of an example of an LU command pressure map used when an engaged lockup clutch pressure during the engine running is controlled.

If the EV/EHV running determining portion 86 determines that the vehicle 10 is during the engine running, the lockup control portion 82 determines whether the vehicle is in the lockup-on range, based on the actual vehicle speed V and throttle valve opening degree θth from the lockup range diagram as depicted in FIG. 3, for example. If it is determined that the vehicle is in the lockup-on range, the lockup control portion 82 outputs a predetermined LU command pressure Slu to the hydraulic control circuit 50 to engage the lockup clutch 38. This predetermined LU command pressure Slu is a value predefined as the LU command pressure Slu for acquiring the engaged lockup clutch pressure capable of certainly transmitting the engine torque Te and the electric motor torque Tm corresponding to the request drive torque Touttgt during the engine running, for example. Specifically, the predetermined LU command pressure Slu is a uniform LU command pressure Slu as indicated by a solid line or a dashed-two dotted line of FIG. 6 and is preferably a maximum command pressure (see the solid line of FIG. 6) at which the maximum engaged lockup clutch pressure is acquired. Alternatively, as indicated by broken lines of FIG. 6, the predetermined LU command pressure Slu may have a plurality of uniform LU command pressure Slu values corresponding to the request drive torque Touttgt and set in stages.

Figure 7:
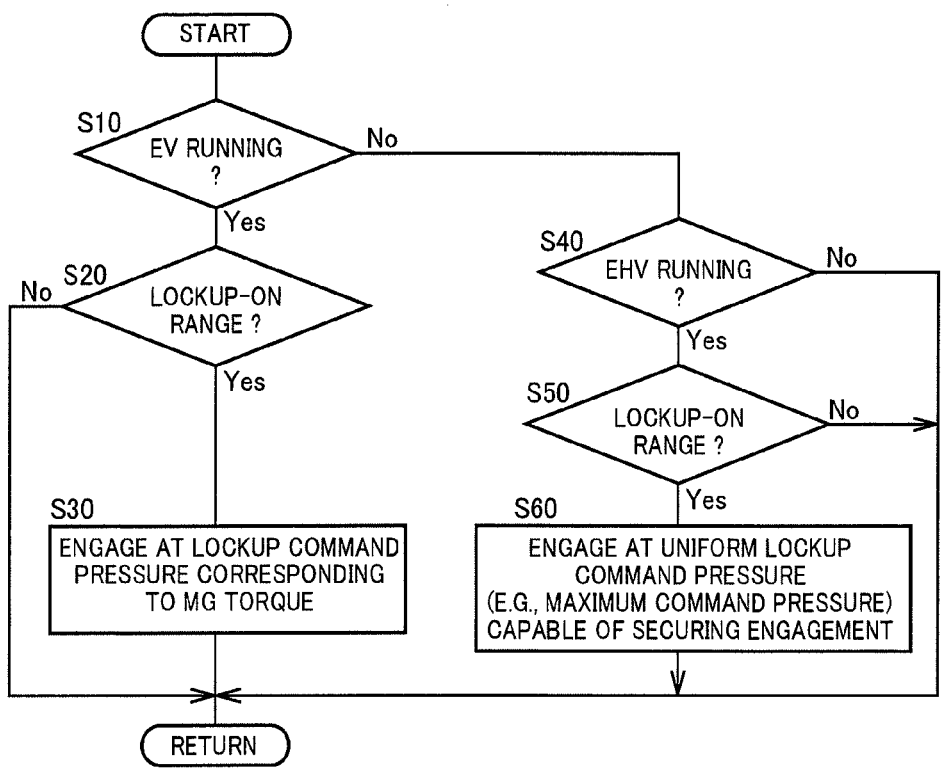
FIG. 7 is a flowchart for explaining a main portion of a control operation of the electronic control device, i.e., the control operation for satisfying both the suppression of the engine start shock and the improvement in drivability when the engine is started during the motor running with the lockup clutch engaged.
Figure 8:
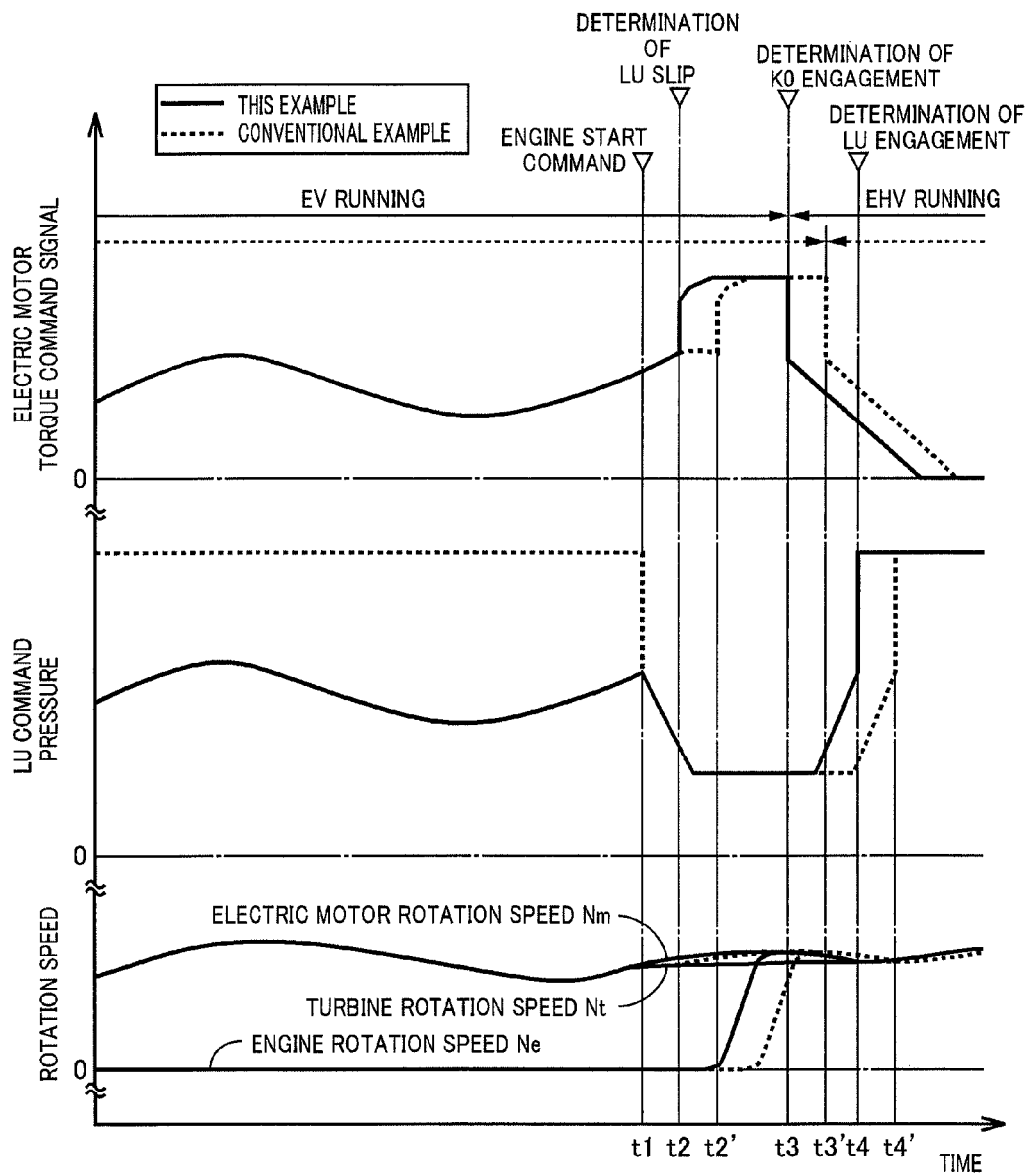
FIG. 8 is a time chart when the control operation depicted in the flowchart of FIG. 7 is executed.

FIG. 7 is a flowchart for explaining a main portion of a control operation of the electronic control device 80, i.e., the control operation for satisfying both the suppression of the engine start shock and the improvement in drivability when the engine is started during the motor running with the lockup clutch 38 engaged, and is repeatedly executed with an extremely short cycle time, for example, on the order of a few msec to a few tens of msec. FIG. 8 is a time chart when the control operation depicted in the flowchart of FIG. 7 is executed.

In FIG. 7, first, at step (hereinafter, step will be omitted) S10 corresponding to the EV/EHV running determining portion 86, it is determined whether the vehicle 10 is during the EV running, for example. If the determination of S10 is affirmative, it is determined at S20 corresponding to the lockup control portion 82 whether the vehicle is in the lockup-on range. If the determination of S20 is negative, this routine is terminated and, if affirmative, at S30 corresponding to the lockup control portion 82, the lockup clutch 38 is engaged at the LU command pressure (lockup command pressure) Slu corresponding to the electric motor torque Tm during the EV running (before time t1 of FIG. 8). If the determination of S10 is negative, it is determined at S40 corresponding to the EV/EHV running determining portion 86 whether the vehicle 10 is during the engine running (during the EHV running), for example. If the determination of S40 is negative, this routine is terminated and, if affirmative, it is determined at S50 corresponding to the lockup control portion 82 whether the vehicle is in the lockup-on range. If the determination of S50 is negative, this routine is terminated and, if affirmative, at S60 corresponding to the lockup control portion 82, the lockup clutch 38 is engaged at the uniform LU command pressure Slu (e.g., the maximum command pressure) at which the lockup clutch 38 is certainly engaged (after time t4 of FIG. 8).

The time chart of FIG. 8 depicts an example when the engine 14 is started during the EV running with the lockup clutch 38 engaged, for example. Solid lines of FIG. 8 represent this example and broken lines represent a conventional example. In the conventional example represented by the broken lines of FIG. 8, a uniform LU command pressure Slu (e.g., maximum command pressure) is output as the LU command pressure Slu for engaging the lockup clutch 38 in both the EV running and the engine running (EHV running) (before time t1 and after time t4' of FIG. 8). Therefore, at the engine start, since the LU command pressure Slu is reduced from this maximum command pressure to the LU command pressure Slu for slip-engagement, a relatively longer time is required for the lockup clutch pressure to actually decrease until the lockup clutch 38 is slip-engaged (see time t2' of FIG. 8). Therefore, a relatively longer time is required after the determination of the engine start (after an engine start command is output) until the engine start is actually initiated (see time t2' of FIG. 8), resulting in a delay of transition to the engine running (time t3' of FIG. 8). In this example represented by the solid lines of FIG. 8, a uniform LU command pressure Slu is output as the LU command pressure Slu for engaging the lockup clutch 38 in consideration of the simplified controllability and the actual torque variation of the engine 14 in the engine running (after time t4 of FIG. 8). On the other hand, in the EV running, as can be seen from the LU command pressure Slu varied to follow the electric motor control command signal (electric motor torque command signal) Sm, an LU command pressure Slu corresponding to the electric motor torque Tm is output as the LU command pressure Slu for engaging the lockup clutch 38 in consideration of the engine start (before time t1 of FIG. 8). As a result, while the lockup clutch 38 is certainly engaged during the EV running, the LU command pressure Slu is reduced at the engine start from the LU command pressure Slu corresponding to the electric motor torque Tm to the LU command pressure Slu for slip-engagement and, therefore, the time until the slip-engagement of the lockup clutch 38 is made relatively shorter (see time t2 of FIG. 8). Thus, the time is made relatively shorter after the engine start command is output until the engine start is actually initiated (see time t2 of FIG. 8) and the transition to the engine running is made earlier (time t3 of FIG. 8). Time t2 and time t2' of FIG. 8 are time points when a differential rotation speed between the electric motor rotation speed Nm and the turbine rotation speed Nt becomes equal to or greater than a predetermined differential rotation defined in advance for determining the slip-engagement of the lockup clutch 38 and are also time points when the engine start is actually initiated for the engine start command.

As described above, according to this example, since the lockup clutch 38 is slip-engaged or released when the engine 14 is started during the EV running with the lockup clutch 38 engaged, it is desirable to enable a quick transition to slip-engagement or release while the engagement of the lockup clutch 38 is maintained during the EV running and, in this regard, the engaged lockup clutch pressure during the EV running can be made lower as compared to the engine running, thereby making a quick transition to slip-engagement or release to initiate the start of the engine 14. Thus, both the suppression of engine start shock and the improvement in drivability can be satisfied at the engine start during the EV running with the lockup clutch 38 engaged. On the other hand, also when the engine 14 is stopped during the engine running with the lockup clutch 38 engaged, it is conceivable that the lockup clutch 38 is slip-engaged or released in the same way so as to suppress a shock due to torque variation. However, at the engine stop, since it is considered that a driver does not desire a quick stop of the engine 14 unlike the engine start at which it is considered that the driver desires an increase in the drive torque Tout, the engaged lockup clutch pressure during the engine running can be set higher as compared to the EV running so as to reduce the control of changing the engaged lockup clutch pressure depending on the engine torque Te as compared to the EV running, thereby making the control easier (i.e., simplifying the control).

According to this example, the engaged lockup clutch pressure is constantly adjusted based on the electric motor torque Tm during the EV running while the engaged lockup clutch pressure is not adjusted during the engine running and, therefore, during the EV running, the engaged lockup clutch pressure can be made lower as compared to during the engine running while the engagement of the lockup clutch 38 is maintained, such that the transition to slip-engagement or release can quickly be made when the engine 14 is started. On the other hand, during the engine running, the lockup clutch 38 can certainly be engaged at the engaged lockup clutch pressure higher as compared to during the EV running while the control of the engaged lockup clutch pressure is simplified. Additionally, appropriate measures can be taken against the engine 14 having larger actual torque variation relative to a command value as compared to the electric motor MG.

According to this example, since the engine 14 is started while the engine connecting/disconnecting clutch K0 is controlled toward engagement at the engine start during the motor running with the engine connecting/disconnecting clutch K0 released, the engine start shock due to torque variation associated with explosion at the engine start can obviously be suppressed, and the engine start shock associated with engagement of the engine connecting/disconnecting clutch K0 can also be suppressed.

Although the example of the present invention has been described in detail with reference to the drawings, the present invention is applied in other forms.

For example, although the engine connecting/disconnecting clutch K0 is released when the EV running is performed in the example, the EV running may be performed while the engine connecting/disconnecting clutch K0 remains engaged or slip-engaged. In such EV running, the running is performed while the engine 14 is dragged, and the engine can directly be started by only performing ignition etc. Although the engine start shock associated with engagement of the engine connecting/disconnecting clutch K0 does not occur, the engine start shock may occur due to torque variation associated with explosion at the engine start and, therefore, certain effect is acquired by applying the present invention. Thus, the present invention is applicable even to a vehicle without the engine connecting/disconnecting clutch K0.

Although the lockup clutch 38 is exemplarily illustrated as a clutch capable of achieving a mechanically directly-coupled state of the power transmission path between the engine 14/the electric motor MG and the drive wheels 34 in the example, this is not a limitation. For example, even if the clutch is an engagement device such as the clutches C and the brakes B of the automatic transmission 18, the present invention is applicable. In such a case, both the suppression of engine start shock and the improvement in drivability can be satisfied at the engine start during the EV running with the engagement device of the automatic transmission 18 engaged. Thus, the lockup clutch 38 may not necessarily be disposed and the present invention is applicable even to a vehicle without the torque converter 16.

Although the torque converter 16 is used as the fluid transmission device in the example, another fluid transmission device such as a fluid coupling without a torque amplification effect may be used instead of the torque converter 16.

Although the LU command pressure Slu corresponding to the electric motor torque Tm is set during the EV running with the lockup clutch 38 engaged in the example, this is not a limitation. For example, a uniform LU command pressure Slu lower as compared to during the engine running may be set during the EV running. Certain effect of the present invention is also acquired in this way.

In the example, when the engine is stropped, the control of causing the lockup clutch 38 to be temporarily slip-engaged or released may not necessarily be provided.

Although the automatic transmission 18 is disposed on the vehicle 10 in the example, the automatic transmission 18 may not necessarily be disposed.

The above description is merely an embodiment and the present invention may be implemented in variously modified and improved forms based on the knowledge of those skilled in the art.

NOMENCLATURE OF ELEMENTS

10: vehicle
14: engine
16: torque converter (fluid transmission device)
16a: pump impeller (input-side rotating member)
16b: turbine impeller (output-side rotating member)
18: automatic transmission
34: drive wheels
38: lockup clutch (clutch)
80: electronic control device (control device)
C: clutches (engagement device included in the automatic transmission)
B: brakes (engagement device included in the automatic transmission)
MG: electric motor
K0: engine connecting/disconnecting clutch (connecting/disconnecting clutch)

The invention claimed is:

1. A control device of a vehicle including an engine, an electric motor, and a clutch configured to achieve a mechanically directly-coupled state of a power transmission path between the engine/the electric motor and drive wheels, the control device causing the clutch to be slip-engaged or released when the engine is started during motor running in which only the electric motor is used as a drive force source for running with the clutch engaged, the control device being configured such that
   when the clutch is engaged during the motor running, an engagement pressure is made lower than an engagement pressure when the clutch is engaged during engine running in which at least the engine is used as a drive force source for running, and
   in the case of running with the clutch engaged, the engagement pressure of the clutch is constantly adjusted based on output torque of the electric motor during the motor running, while the engagement pressure of the clutch is not adjusted during the engine running.

2. The control device of a vehicle of claim 1, wherein
   a fluid transmission device is disposed on the power transmission path between the engine/the electric motor and the drive wheels, wherein
   the clutch is a lockup clutch configured to directly couple an input-side rotating member and an output-side rotating member of the fluid transmission device.

3. The control device of a vehicle of claim 1, wherein
   an automatic transmission is disposed that makes up a portion of a power transmission path between the electric motor and the drive wheels, and wherein
   the clutch is an engagement device included in the automatic transmission.

4. The control device of a vehicle of claim 1, wherein
   a connecting/disconnecting clutch is included that connects/disconnects a power transmission path between the engine and the electric motor, and wherein during the motor running with the connecting/disconnecting clutch released, the engine is started while the connecting/disconnecting clutch is controlled toward engagement.

* * * * *